United States Patent [19]

Mortier et al.

[11] 3,936,994

[45] Feb. 10, 1976

[54] MEANS FOR CONVERTING A PICKUP ON A CROP TREATING MACHINE BETWEEN FIELD AND TRANSPORT POSITIONS

[75] Inventors: Frans Henri Mortier, Maldegem; Willy Rene Evarist Dekeyser, Vladslo, both of Belgium; Loren Gage Sadler, Stevens, Pa.

[73] Assignee: Sperry Rand Corporation, New Holland, Pa.

[22] Filed: Mar. 28, 1974

[21] Appl. No.: 455,699

[52] U.S. Cl. .............................. 56/228; 280/415 R
[51] Int. Cl.² .......................................... A01D 75/22
[58] Field of Search ........... 56/228, 192; 280/415 R, 280/34 A; 172/625, 248

[56] References Cited
UNITED STATES PATENTS

| | | | |
|---|---|---|---|
| 3,338,037 | 8/1967 | Bauer et al. | 56/228 X |
| 3,478,499 | 11/1969 | Van Der Lely | 56/228 X |

Primary Examiner—Louis G. Mancene
Assistant Examiner—J. N. Eskovitz
Attorney, Agent, or Firm—John R. Flanagan; Frank A. Seemar; Joseph A. Brown

[57] ABSTRACT

A series of rollers mounted at spaced locations on a windrow pickup about a rear discharge opening defined therein interengage with a circular track mounted on a crop material chopping chamber of a forage harvester and at least partially encircling a front receiving opening defined therein to continuously support the pickup on the chopping chamber in an operating field position, in a non-operating transport position and for pivotal movement relative thereto between the field and transport positions. The interengaging series of rollers and circular track are moveable relative to each other to provide pivotal movement of the pickup relative to the chopping chamber between the field and transport positions within a plane extending in a generally transverse relationship to the direction of movement of the forage harvester across the field and about a pivotal axis located generally at the center of curvature of the circular track.

15 Claims, 2 Drawing Figures

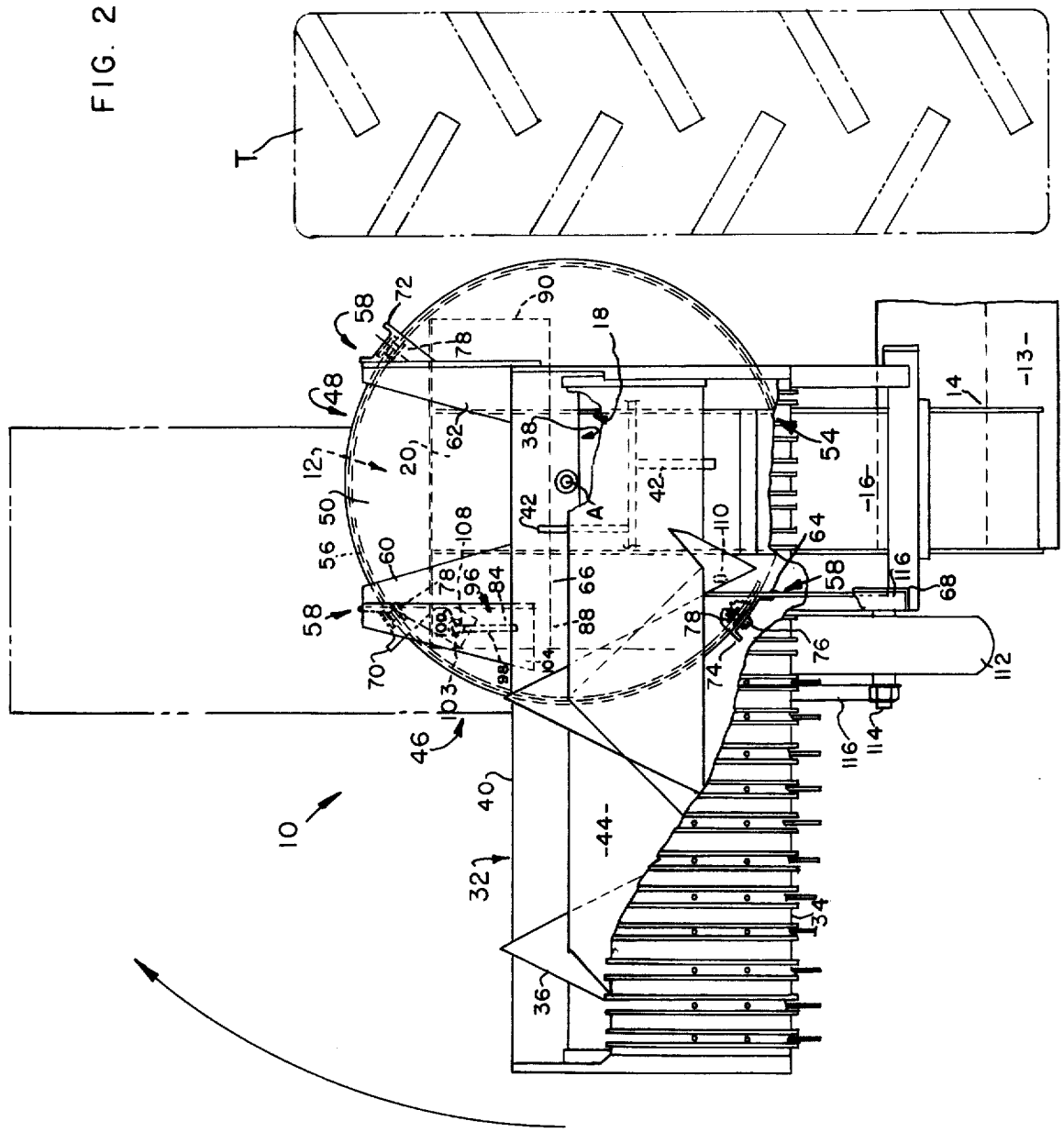

MEANS FOR CONVERTING A PICKUP ON A CROP TREATING MACHINE BETWEEN FIELD AND TRANSPORT POSITIONS

BACKGROUND OF THE INVENTION

1. Field of the Invention

The present invention relates generally to machines for treating crop material, such as forage harvesters which chop crop material into small pieces, and, more particularly, is concerned with means for converting a crop material delivering means, such as a windrow pickup, mounted on the machine between field and transport positions.

2. Description of the Prior Art

A crop material treating or harvesting machine, such as a forage harvester, combine or the like, commonly utilizes a crop delivering means, such as a conventional crop material pickup, which is mounted on the front of the machine and extend laterally beyond one or both sides of the machine in order that a swath of crop material, substantially wider than the machine, may be delivered by the means from the field to the machine. However, utilization of the aforementioned type of pickup presents difficulties when it is desired to transport such machine along public or other roads, over narrow bridges and through narrow field gates between harvesting operations.

Several methods have been employed to convert the delivering means prior to machine transport to within the narrower machine width and thus avoid difficulties during the transporting of such machine.

One method found in the prior art has been to pivotally couple the one portion of the delivering means which extends laterally beyond a side of the machine to one end of the remaining portion of the delivering means disposed within the lateral sides of the machine and then pivotally fold the one portion toward the remaining portion, such as illustrated and described in U.S. Pat. No. 2,224,970.

Another method found in the prior art, generally similar to the one method mentioned above, has been to mount each of a pair of delivering means on a pivot pin which extends axially in the general direction of machine travel and is mounted to frame parts of the machine and then pivotally move each delivering means about its pivot pin, such as illustrated and described in U.S. Pat. Nos. 3,258,901, 3,345,808, 3,478,499, 3,503,190, 3,540,195 and 3,683,601.

While the aforementioned prior art methods appear to satisfactorily avoid the difficulties associated with the transporting of such machine, it is noted that these respective methods contemplate supporting the delivering means on the machine both at the field and transport positions and during its pivotal movement between these positions by generally the same member which also pivotally couples the delivering means to the machine and is located at the pivotal axis of the delivering means. It is believed that, under most circumstances, a delivering means so supported and pivotally coupled on the machine, and ordinarily having a substantial weight, continuously focuses and imposes undesirably high, excessive bearing loads on the axially-located supporting and coupling member and on the structural portions of the delivering means immediately adjacent thereto which has a tendency to eventually result in bending or cracking and thus failure of such structural portions unless relatively complex, heavy duty and expensive structural reinforcement is provided.

SUMMARY OF THE INVENTION

The present invention avoids the aforementioned imposition of excessive bearing loads and resulting tendency toward structural failure by distributing the bearing load of the delivering means over a greater area on both the means itself and the machine to which it is mounted and away from the axis about which the delivering means is pivotally moved between the field and transport positions.

Accordingly, in a machine for treating crop material during movement across a field and being of the type which includes a frame, crop material receiving and treating means mounted on the frame and means for delivering crop material from the field to the receiving and treating means, an improved means of the present invention for converting the machine between a field position and a transport position broadly comprises means continuously supporting said delivering means on the receiving and treating means in an operating field position, in non-operating transport position and for pivotal movement relative thereto between the positions, with the pivotal movement of the delivering means being within a plane extending in a generally transverse relationship to the direction of machine movement across the field and about a pivotal axis from which the continuously supporting means is disposed at a spaced location.

More particularly, the improved converting means further comprises means pivotally coupling the delivering means and the receiving and treating means to each other at the pivotal axis. Further, interengaging means is disposed on both the delivering means and the receiving and treating means for releasably latching the delivering means in a fixed relationship to the receiving and treating means when the delivering means is at least in its operating field position.

When the delivering means is in its operating field position, the machine has a first width and the delivering means is supported in a generally horizontal plane. When the delivering means is in its non-operating transport position, the machine has a second width less than its first width and the delivering means is supported in a generally upright plane. The delivering means dependingly mounts and carries a ground wheel for additionally supporting the delivering means when in its operating field position. When the delivering means is in its non-operating transport position, the wheel may be adjusted between a first position in which the wheel generally extends outside of the limits of the second width of the machine and a second position in which said wheel is generally within the limits of the second width of the machine.

Still more particularly, the continuously supporting means comprises circular track means at least partially encircling, and having a center of curvature coincident with, the pivotal axis and being fixedly mounted to one of the delivering means and receiving and treating means. Specifically, the circular track means is fixedly mounted on a forward side of the receiving and treating means and also at least partially encircles a crop material receiving opening defined in the receiving and treating means.

Further, more particularly, the continuously supporting means comprises track follower means fixedly mounted to the other of the delivering means and the receiving and treating means and coupled to the circular track means for supporting the delivering means on the receiving and treating means and for allowing relative movement between the track follower means and the circular track means in pivotally moving the delivering means relative to the receiving and treating means between the field and transport positions. Specifically, the track follower means comprises a plurality of roller elements mounted on a rearward side of the delivering means and disposed outwardly from the pivotal axis at spaced apart locations and outwardly from a crop material discharge opening defined in the delivering means.

The receiving opening and the discharge opening are in communication when the delivering means is in its operating field position. Further, the means pivotally coupling the delivering means and the receiving and treating means to each other at the pivotal axis is located above the receiving and discharge openings.

Being also directed to other types of applications and uses, the present invention broadly relates to an improved means for converting a mobile agrricultural machine between field and transport positions where the machine has a base component and another component intended to be moved in relation to the base component to convert the machine between its field and transport positions. The converting means comprises track means at least partially defining a circle and being fixedly mounted to one of the base component or the another component, and track follower means fixedly mounted to the other of the base component or the another component and coupled to the circular track means for allowing relative movement between the track follower means and the circular track means to provide pivotal movement of the another component relative to the base component and thereby convert the machine between its field and transport positions.

Other advantages and attainments of the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following description reference will be frequently made to the attached drawings in which:

FIG. 2 is a front elevational view of the forage harvester, on a slightly smaller scale than that of FIG. 1, with parts of the harvester broken away and showing the harvester tilted rearwardly approximately 45° from its normal operating ground position (as would be corresponding seen in side elevation in FIG. 1 by rotating FIG. 1 clockwise approximately 45°) in order to more clearly expose to view the continuously supporting means broadly comprising the improved converting means of the present invention.

DETAILED DESCRIPTION OF THE INVENTION

Figure 1:
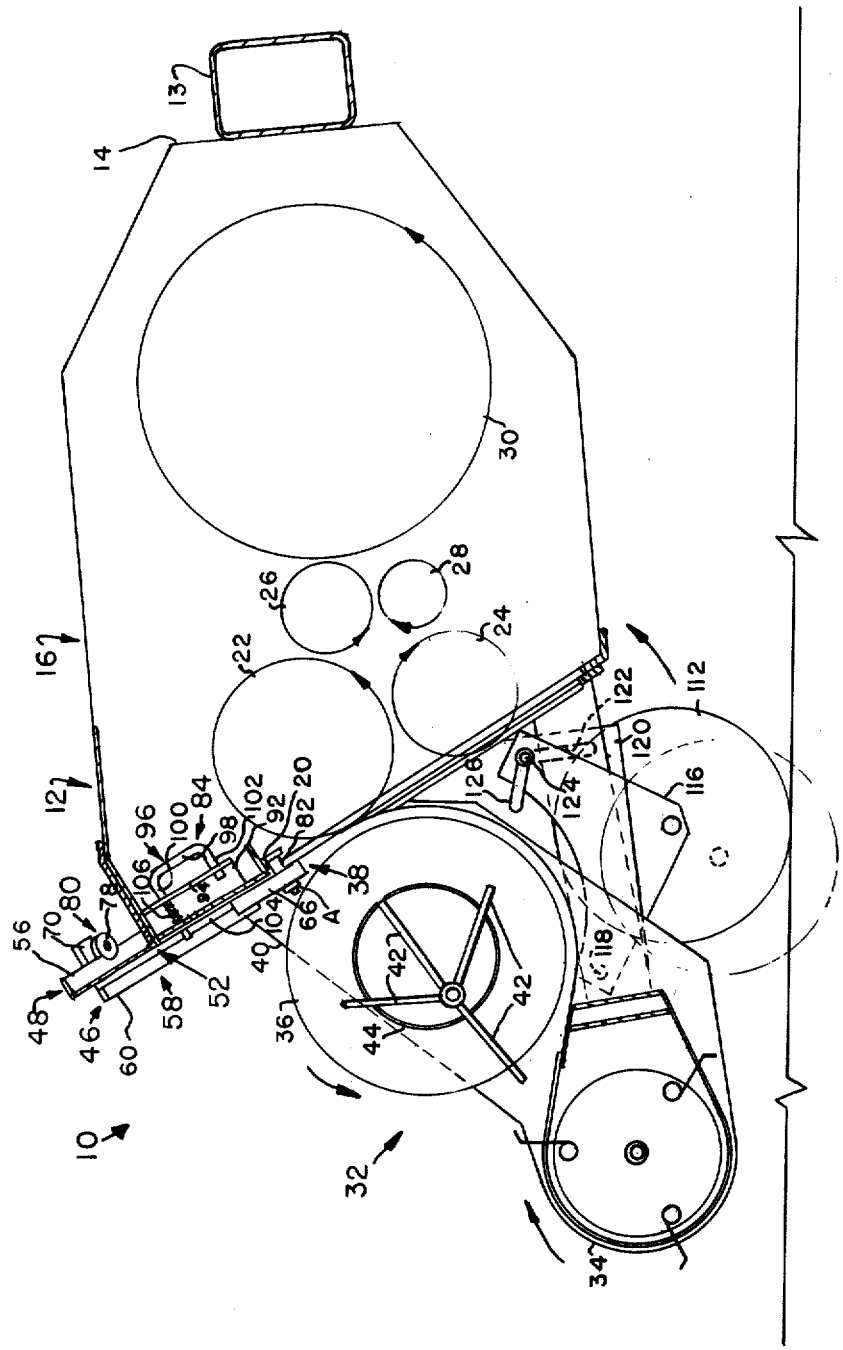
FIG. 1 is a side elevational view of a forage harvester embodying the principles of the present invention with some parts of the harvester being schemically illustrated, other parts being omitted and still other parts being shown in cross-section.

In the following detailed description, right hand and left hand references are determined by standing at the rear of the machine, such being at the far right side of FIG. 1 and behind the sheet containing FIG. 2, and facing in the direction of forward travel, such being toward the far left side of FIG. 1 and facing out of the sheet containing FIG. 2. Also, in the following detailed description, it is to be understood that such terms as "forward," "rearward," "left," "upwardly," etc., are words of convenience and not to be construed as limiting terms.

IN GENERAL

Referring now to FIGS. 1 and 2, there is shown a mobile agricultural machine, such being a preferred crop material treating or harvesting machine, generally indicated by numeral 10, for incorporating the improved converting means of the present invention, namely a forage harvester. Particularly, the forage harvester 10 illustrated is of the type intended to be mounted on the rear end of a tractor (not shown) by suitable mounting frame components and disposed in a side-by-side relationship to one of a pair of rear traction wheels T of the tractor. However, the improved converting means of the present invention is not so specifically limited, in its potential applications, solely to tractor-mounted forage harvesters, nor, for that matter, generally limited to forage harvesters of varying types, but may be applied or adapted to the general class of mobile agricultural machine or classes of crop harvesting or treating machines, such as, in addition to forage harvesters, to combines, mower-conditions, windrowers or the like, as desired.

CROP MATERIAL RECEIVING AND TREATING MEANS

The forage harvester 10 has crop material receiving and treating means, generally indicated by numeral 12, positioned adjacent the outer right side of the wheel T of the tractor (not shown) by the aforementioned mounting frame components, such as a transverse hitch bar 13 which would be mounted at one end to a tractor hitch assembly (not shown) and at an opposite end would be clamped to the rear end 14 of a casing 16 shown in FIG. 1 which encloses the major operative components of the receiving and treating means 12.

Since the important features and operative components of the receiving and treating means 12 of the forage harvester 10 are generally well known in the art, only the general arrangement and functions thereof will be briefly described hereinafter.

A crop material receiving opening 18 defined in front wall 20 of the casing 16 allows delivery of crop material in a rearwardly direction, from left to right in FIG. 1, into the casing 16. A pair of transversely-extending, counter-rotating front feed rolls 22, 24 located within the casing 16 adjacent the receiving opening 18 receive the crop material and move it rearwardly therebetween to a pair of transversely-extending, identically counter-rotating rear feed rolls 26, 28. These latter rolls 26, 28 move the crop material rearwardly therebetween and feed it into a cutter mechanism 30 which chops the crop material into small pieces and discharges it through a transition member (not shown) to a spout (not shown) for delivery to a truck or trailing wagon (not shown).

CROP MATERIAL DELIVERING MEANS

The forage harvester 10 further has crop material delivering means, generally indicated by number 32, mounted on the front of the casing 16 of the receiving and treating means 12 for delivering crop material from the field, such as by a rotating pickup component 34, and to the receiving and treating means 12, such as by a rotating auger component 36.

The auger component 36 receives the material from along the pickup component 34 and laterally from left to right, as seen in FIG. 2, feeds the material toward a discharge opening 38 defined in the left rear end of a housing or feed trough 40 of the delivering means 32. Retractable fingers 42 suitably mounted within and projecting from the auger cylinder 44 deliver the laterally feeding crop material through the housing discharge opening 38 and concurrently through the receiving opening 18 of the casing 16 and then to between the front feed rolls 22, 24 as described hereinbefore.

Power for driving the operative components of the delivering means 32 and the receiving and treating means 12 is generally supplied by the power takeoff of the tractor being interconnected to a gearbox (not shown) mounted to the transverse hitch bar 13 near the rear end 14 of the casing 16 by a power transmission shaft (not shown) running generally parallel to and below the hitch bar 13.

On the outboard right side of the casing 16 are exposed suitably sprockets (not shown) fixed to respective shafts of the rolls 22, 24, 26, 28, the cutter mechanism 30 and other mechanisms for discharging the chopped crop material from the casing 16, which sprockets are drivingly coupled by a chain to a drive sprocket (not shown) on an output shaft (not shown) of the gearbox.

On the inboard left side of the forage harvester 10 are exposed suitable arrangements of chain and sprockets (not shown) for intercoupling shafts of the pickup 34, the auger 36 and the mechanism of retractable feed fingers 42 and pulley and sheaves (not shown) for drivingly coupling another output drive shaft (not shown) of the gearbox to the chain and sprockets through a driven shaft (not shown) of the delivering mean 32.

CONVERTING MEANS

Improved means for converting the forage harvester 10 between an operating field position, as shown in FIG. 1 and in solid line in FIG. 2, and a non-operating transport position, as shown in broken line in FIG. 2, primarily comprises support means, generally designated by numeral 46, which continuously supports the delivering means 32 on the receiving and treating means 12 in the operating field position, in the non-operating transport position and for pivotal movement relative thereto between the field and transport positions. The support means 46 allows pivotal movement of the delivering means 32 within a plane extending in a generally transverse relationship to the direction of harvester movement across the field.

When the delivering means 32 is in its operating field position, as shown in solid line in FIG. 2, it is supported in a generally horizontal plane and extends substantially beyond the right side of the receiving and treating means 12. Thus, the field width of the harvester is effectively the transverse distance between the outer right portion of the delivering means 32 and the extreme left portion (not shown) of the tractor which ordinarily would be the left rear traction wheel. However, when the delivering means 32 is pivotally moved through an approximately 90° clockwise angular displacement from its solid line field position to its broken line transport position, as shown in FIGS. 2, it is then supported in a generally upright or nearly vertical plane and it is seen that it extends in general alignment with the right side of the receiving and treating means 12. Therefore, now the transport width of the harvester is effectively the transverse distance between the outer right side of the receiving and treating means 12 (or the outer right portion of the upturned delivering means 32) at one extreme and the left traction wheel of the tractor at the other extreme. It is readily apparent that the transport width of the harvester and tractor combined is significantly narrower than their combined field width.

The support means 46 includes a circular track means, being generally indicated by numeral 48, formed by a circular plate 50 having a central slot 52 for receiving the front wall 20 of the casing 16 when the plate 50 is fixedly mounted in any suitably manner about the front end of the casing 16. The plate 50 peripherally encircles the casing 16 through approximately 300° with the slot 52 opening at the periphery of the plate 50 at the bottom end 54 thereof, as seen in FIGS. 2.

The circular track means 48 is further formed by a flange or track 56 which is integrally formed on, welded or otherwise suitably rigidly secured to the periphery of the circular plate 50 and runs substantially therealong for the whole 300° of the plate periphery. The track 56 preferably projects generally rearwardly from, and perpendicularly to the plane of, the plate 50. However, the track could readily be disposed at other angular relationships to the plane of the plate depending on the particular supporting relationship, the plane of pivotal movement, one desires to provide between respective components of a machine.

The support means 46 further includes track follower means, being generally indicated by numeral 58, fixedly mounted in any suitably manner to the rear side of the delivering means 32.

The track follower means 58 is preferably composed of a series of three spaced apart braces 60, 62, 64 being fixedly attached to the rear side of the delivering means 32. Two upper braces 60, 62, as seen in FIG. 2 are welded, or secured in any suitable manner, along the top edge portion of an upper rear structural member 66 of the trough or housing 40 and extend upwardly therefrom when the delivering means 32 is in its solid line operating field position as illustrated in FIG. 2. A third lower brace 64 is welded, or otherwise suitably secured, to a lower rear frame 68 securely connected to the housing 40.

Further composing the track follower means 58 is a series of brackets 70, 72, 74 which each by a fastening element 76 rotatably mount a roller element 78. Each of the brackets 70, 72, 74 project generally rearwardly in the direction of the casing 16 and beyond the periphery of the plate 50 and, still further, beyond the track 56. As readily seen in FIG. 1, the roller elements 78 (only one being shown) are rotatably mounted to respectively free outer end portions of the brackets 70, 72, 74 on the side thereof adjacent to the track 56. As clearly seen in FIG. 1, each of the roller elements 78 has a continuous circular groove 80 formed in its periphery which receives therein a rear outer peripheral edge 82 of the track 56.

It is readily apparent, therefore, that the respective roller elements 78 are disposed radially outwardly from the axis A about which the delivering means 32 may be pivotally moved relative to the receiving and treating means 12 and at spaced apart locations lying on a circle which substantially coincides with that defined by the circular track 56. Further, it is readily understood that the interengaging relationship between the roller elements 78 and the ciruclar track 56 couples the track follower means 58 to the circular track means 48 for supporting the delivering means 32 on the receiving and treating means and for allowing relative rotational movement between the track follower means 58 and the circular track means 48 in pivotally moving the delivering means 32 relative to the receiving and treating means 12 between the solid line operating field position as shown in FIGS. 1 and 2, and the broken line non-operating transport position, as shown in FIG. 2. Prior to conversion of the delivering means 32 from its field position to its transport position, however, it will be necessary to uncouple the aforementioned drive pulley (not shown) which extends between the gearbox and the drive shaft of the delivering means on the inboard left side of the harvester 10.

The improved converting means additionally comprises a pivot pin means 82 rotatably coupling the delivering means 32 and the receiving and treating means 12 to each other about their aforementioned pivotal axis. The pivot pin means 82 extends through the upper rear structural member 66 of the trough or housing 40 of the delivering means 32 and through the front wall 20 of the casing 16 of the receiving and treating means 12 just above their respective discharge and receiving openings 38, 18. While the pin means 82 may provide some additional support function to the delivering means 32 in its mounting arrangement on the receiving and treating means 12, in view of the interengaging, coupled relationship between the roller elements 78 of the track follower means 58 with the track 56 of the circular track means 48, the loading weight of the delivering means 32 is now significantly shared with the support means 46 by the pivot pin means 82 and thereby the imposition of excessive bearing forces thereon is minimized or eliminated.

Still further, the improved converting means includes interengaging means, generally designated 84, for releasably latching the delivering means 32 to the receiving and treating means 12 in fixed relationships when the delivering means 32 is respectively in its field position and transport positions.

The interengaging means 84 includes a bracket 86 mounted along the right outboard side of the casing 16, as clearly shown in FIG. 2 (being also shown in solid line in FIG. 1 although it would be on the opposite or hidden side of casing 16 from which the figure is viewed), to the right one of a pair of wing flanges 88, 90 extending laterally from the upper portion of the front casing wall 20 to which is affixed the upper portion of the plate 50. A forward portion 92 of the bracket 86 is fixed, bolted or otherwise suitably secured to the rearward side of the wing flange 88 and merges into a lateral, 90 degree rearward portion 94. A latch member 96, having a handle portion 98 with an upper, forwardly-extending plunger portion 100 and a lower, forwardly-extending shorter retaining portion 102, extends at its portion 100 through a hole in the rearward bracket portion 94, on through complementary holes in the wing flange 88 and plate 50, and finally through a first latching hole 103 in a lateral brace 104 fixed to the right upper brace 60. A spring 106 is mounted about the plunger portion 100 between the rearward bracket portion 94 and a washer 108 held against the spring 106 by a key through the plunger portion 100.

In FIGS. 1 and 2, the interengaging means 84 is shown latching the delivering means 32 in a first fixed relationship to the receiving and treating means 12 when the delivering means 32 is in its operating field position.

To unlatch the interengaging means 84, the handle portion 98 of the latch member 96 is gripped and pulled rearwardly against the forwardly directed bias of the spring 106 until the terminal end of the retaining portion 102 is located rearwardly of the rearward bracket portion 94, whereupon slight counterclockwise rotation of the latch member 96 and, then, releasing thereof seats the terminal end of the retaining portion 102 on the rear surface of the rearward bracket portion 94. With the retaining portion 102 so seated, the terminal end of the plunger portion 100 is now retracted to a position rearwardly of the first latching hole 103 of the lateral brace 104 on the delivering means 32 and retained at such position. Now, the delivering means 32, after the aforementioned drive belt is uncoupled therefrom, can be readily pivoted or rotated, such as by one man, from its solid line field position to its broken line transport position, as seen in FIG. 2.

When the delivering means 32 is placed in its transport position a second latching hole, designated as 110 in FIG. 2, will be aligned with the aforementioned complementary holes in the wing flange 88 and plate 50. Reversing the above-described unlatching procedure deposits the terminal end of the plunger portion 100 back through the second latching hole 108 and thus locks the delivering means 32 in its transport position. Obviously, the aforementioned procedure can be again repeated to return the delivering means 32 to its field position.

Finally, the improved converting means includes a ground wheel 112 mounted from, and carried by, the delivering means 32 at its lower rearward side. The wheel 112 is rotatably mounted by an axle 114 which extends between, and is fastened at its opposing ends to, the respective lower apices of a pair of spaced apart, generally V-shaped support plates 116. When the delivering means 32 is in its field position, as shown in FIG. 1, the support plates 116 are pivotally coupled by fastener element 118 at their respective forward ends to correspondingly adjacent forward ends of a pair of spaced apart mounting plates 120 being fixed to the rear underside of the trough or housing 40 of the delivering means 32 and which extend downwardly and rearwardly therefrom within the narrow clearance between the support plates 116 and the opposite sides of the wheel 112 and above the wheel axle 114. A generally vertical slot 122 is defined in the opposite rearward ends of each of the mounting plates 120 for receiving a fastening element 124 having an adjusting handle 126 threadably engaged thereon at one end of the element 124, which element 124 also extends through a hole in each of the support plates 116 being aligned with the corresponding slot 122. Thus, the height of the delivering means 32 above the field surface may be adjusted by unloosening the handle 126 on the fastening element 124 and then pivoting the support plates 116 with the wheel 112 in relation to the mounting plates 120 about the fastener element 118 to a desired position before the handle 126 is again tightened on the fastening element 124 to fix the support plates 116 in the desired position relative to the mounting plates 120.

When the delivering means 32 has been moved to its transport position, as shown in broken line in FIG. 2, the wheel 112 will normally extend laterally beyond the upright delivering means 32 and, thus, outside of its desired transport width unless further adjustment to the position of the wheel 112 is made. Such adjustment is accomplished by removing the fastening element 118, loosening the handle 126 on the fastening element 124, pivoting the support plate 116 in a counterclockwise direction, as seen in FIG. 1, to place the wheel 112 in a position generally rearwardly of the rearward ends of the mounting plates 120; and when the fastening element 124 is positioned at the upper ends of the slots 112, the handle 126 is again tightened on the element 124 to hold the wheel 112 in the aforementioned position generally directly behind the trough 40 of the delivering means 32 and within the combined transport width of the forage harvester 10 and the tractor. By reversing the aforementioned procedure, the wheel 112 may be returned to its desired position generally laterally beyond the upright delivering means 32 prior to conversion of the delivering means 32 back to its field position.

It is thought that the invention and many of its attendant advantages will be understood from the foregoing description and it will be apparent that various changes may be made in the form, construction and arrangement of the converting means described without departing from the spirit and scope of the invention or sacrificing all of its material advantages, the form hereinbefore described being merely a preferred or exemplary embodiment thereof.

Having thus described the invention, what is claimed is:

1. In machine for treating crop material during movement across a field and being of the type which includes a frame, crop material receiving and treating means mounted on said frame and means for delivering said crop material from the field to said receiving and treating means, an improved means for converting said machine between field and transport positions which comprises:
   means supporting said delivering means on said receiving and treating means in an operating field position, in a non-operating transport position and for pivotal movement relative thereto between said positions, said pivotal movement of said delivering means being within a plane extending in a generally transverse relationship to the direction of machine movement across the field and about a pivotal axis from which said supporting means is disposed at a spaced location, said supporting means including a first support member being fixedly mounted to one of said delivering means and said receiving and treating means and a plurality of second, spaced apart support elements mounted to the other of said delivering means and said receiving and treating means and movably coupled to said first support member at locations radially spaced from said pivotal axis for supporting said delivering means on said receiving and treating means and for allowing relative movement between said first support member and said plurality of second support elements in pivotally moving said delivering means relative to said receiving and treating means between said field and transport positions.

2. The machine as recited in claim 1, wherein when said delivering means is in its operating field position said machine has a first width and said delivering means is supported in a generally horizontal plane and when said delivering means is in its non-operating transport position said machine has a second width less than its first width and said delivering means is supported in a generally upright plane.

3. The machine as recited in claim 1, wherein said converting means further comprises:
   means pivotally coupling said delivering means and said receiving and treating means to each other at said pivotal axis.

4. The machine as recited in claim 1, wherein said converting means further comprises:
   interengaging means disposed on both said delivering means and said receiving and treating means for releasably latching said delivering means in a fixed relationship to said receiving and treating means when said delivering means is at least in its operating field position.

5. In a machine for treating crop material during movement across a field and being of the type which includes a frame, crop material receiving and treating means mounted on said frame and means for delivering said crop material from the field to said receiving and treating means, an improved means for converting said machine between field and transport positions which comprises:
   means supporting said delivering means on said receiving and treating means in an operating field position, in a non-operating transport position and for pivotal movement relative thereto between said positions, said pivotal movement of said delivering means being within a plane extending in a generally transverse relationship to the direction of machine movement across the field and about a pivotal axis from which said supporting means is disposed at a spaced location, said machine having a first width when said delivering means is in its operating field position in which it is supported in a generally horizontal plane and said machine having a second width less than its first width when said delivering means is in its non-operating transport position in which it is supported in a generally upright plane; and
   a ground wheel mounted from, and carried by, said delivering means for additionally supporting said delivering means when in its operating field position, said wheel being adjustable, when said delivering means is in its non-operating transport position, between a first position in which said wheel generally extends outside of the limits of said second width of said machine and a second position in which said wheel is generally within the limits of said second width of said machine.

6. In a machine for treating crop material during movement across a field and being of the type which includes a frame, crop material receiving and treating means mounted on said frame and means for delivering said crop material from the field to said receiving and treating means, an improved means for converting said machine between field and transport positions which comprises:
   means supporting said delivering means on said receiving and treating means in an operating field position, in a non-operating transport position and for pivotal movement relative thereto between said positions, said pivotal movement of said delivering means being within a plane extending in a generally transverse relationship to the direction of machine movement across the field and about a pivotal axis from which said supporting means is disposed at a spaced location, said supporting means including circular track means at least partially encircling, and having a center of curvature coincident with, said pivotal axis and being fixedly mounted to one of said delivering means and said receiving and treating means, and track follower means fixedly mounted to the other of said delivering means and said receiving and treating means and coupled to said circular track means for supporting said delivering means on said receiving and treating means and for allowing relative movement between said track follower means and said circular track means in pivotally moving said delivering means relative to said receiving and treating means between said field and transport positions.

7. The machines as recited in claim 6, wherein said converting means further comprises:
  interengaging means disposed on both said delivering means and said receiving and treating means for releasably latching said delivering means in a fixed relationship to said receiving and treating means when said delivering means is at least in its operating field position.

8. The machine as recited in claim 6, wherein said track follower means comprises:
  a plurality of roller elements disposed outwardly from said pivotal axis at spaced apart locations lying on a circle which substantially coincides with said circular track means.

9. The machine as recited in claim 6, wherein said converting means further comprises:
  means pivotally coupling said delivering means and said receiving and treating means to each other at said pivotal axis.

10. The machine as recited in claim 9, wherein:
  said pivotal coupling means comprises a pin element; and
  said track follower means comprises a plurality of roller elements disposed outwardly from said pivotal pin element at spaced apart locations lying on a circle which substantially coincides with said circular track means.

11. The machine as recited in claim 6, wherein:
  said circular track means is fixedly mounted on a forward side of said receiving and treating means and at least partially encircles a crop material receiving opening defined in said receiving and treating means; and
  said track follower means is fixedly mounted on a rearward side of said delivering means outwardly from a crop material discharge opening defined in said delivering means, said receiving opening and said discharge opening being in communication when said delivering means is in its operating field position.

12. The machine as recited in claim 11, wherein said converting means further comprises:
  means pivotally coupling said delivering means and said receiving and treating means to each other at said pivotal axis, said respective receiving and discharge opening being defined in said delivering means and said receiving and treating means below said coupling means.

13. An improved means for converting a mobile agricultural machine between field and transport positions, said machine being of the type having a base component and another component intended to be moved in relation to said base component to convert said machine between its field and transport positions, said improved converting means comprising:
  track means at least partially defining a circle and being fixedly mounted to one of said base component and said another component;
  a plurality of angularly spaced apart track follower elements fixedly mounted to the other of said base component and said another component and movably coupled to said circular track means for allowing relative movement between said plurality of track follower elements and said circular track means to provide pivotal movement of said another component relative to said base component and thereby convert said machine between its field and transport positions; and
  means pivotally coupling said base component and said another component to each other at the center of curvature of said circular track means, said center being coincident with the axis of pivotal movement of said another component relative to said base component.

14. An improved converting means as recited in claim 13, further comprising:
  interengaging means disposed on both said base component and said another component for releasably latching said another component in fixed relationships to said base component respectively when said machine is converted to both of its positions.

15. An improved means for converting a mobile agricultural machine between field and transport positions, said machine being of the type having a base component and another component intended to be moved in relation to said base component to convert said machine between its field and transport positions, said improved converting means comprising:
  track means at least partially defining a circle and being fixedly mounted to one of said base component and said another component; and
  a plurality of angularly spaced apart track follower elements fixedly mounted to the other of said base component and said another component and movably coupled to said circular track means for allowing relative movement between said plurality of track follower elements and said circular track means to provide pivotal movement of said another component relative to said base component and thereby convert said machine between its field and transport positions, said elements being in the form of a plurality of roller elements disposed on said other of said base component and said another component outwardly from the axis of relative pivotal movement of said components at spaced apart locations lying on a circle which substantially coincides with said circular track means.

* * * * *